United States Patent
Pratt et al.

(10) Patent No.: US 9,389,370 B2
(45) Date of Patent: Jul. 12, 2016

(54) OPTICAL CONNECTOR FOR JACKETED CABLES

(71) Applicant: 3M INNOVATIVE PROPERTIES COMPANY, St. Paul, MN (US)

(72) Inventors: Jerome A. Pratt, Round Rock, TX (US); Ronald P. Pepin, Georgetown, TX (US); Joseph C. Sawicki, Austin, TX (US); Shirley E. Ball, Cedar Park, TX (US); Wesley A. Raider, Hudson, WI (US); Donald K. Larson, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 265 days.

(21) Appl. No.: 14/206,839

(22) Filed: Mar. 12, 2014

(65) Prior Publication Data

US 2014/0286611 A1 Sep. 25, 2014

Related U.S. Application Data

(60) Provisional application No. 61/803,924, filed on Mar. 21, 2013.

(51) Int. Cl.
*G02B 6/38* (2006.01)

(52) U.S. Cl.
CPC ............ *G02B 6/3857* (2013.01); *G02B 6/3887* (2013.01); *G02B 6/3898* (2013.01); *G02B 6/3846* (2013.01)

(58) Field of Classification Search
None
See application file for complete search history.

(56) References Cited

U.S. PATENT DOCUMENTS

| | | | |
|---|---|---|---|
| 5,113,474 A | 5/1992 | Slaney |
| 5,414,790 A | 5/1995 | Lee |
| 5,461,690 A | 10/1995 | Lampert |
| 5,563,974 A | 10/1996 | Carpenter |

(Continued)

FOREIGN PATENT DOCUMENTS

| | | |
|---|---|---|
| JP | 3445479 B2 | 6/2003 |
| WO | WO 2006/019515 | 2/2006 |

(Continued)

OTHER PUBLICATIONS

International Search Report for PCT/US2014/024727, mailed on Jul. 11, 2014, 3 pp.

(Continued)

*Primary Examiner* — Charlie Y Peng
(74) *Attorney, Agent, or Firm* — Gregg H. Rosenblatt

(57) ABSTRACT

An optical connector for terminating a jacketed optical fiber cable comprises a housing configured to mate with a receptacle. The connector also includes a collar body disposed in the housing, the collar body securing, at a first end, a ferrule. The collar body includes a gripping mechanism disposed in a second portion of the collar body. The collar body further includes a buffer clamp configured within a third portion of the collar body, the buffer clamp configured to clamp at least a portion of a buffer cladding of the optical fiber upon actuation. The optical connector also includes a backbone to retain the collar body within the housing. The backbone includes a mounting structure surrounding a central bore at one end of the backbone, the mounting structure having at least one pocket region configured to receive a slit portion of the cable jacket. A fiber connector termination and assembly tool is also provided.

14 Claims, 10 Drawing Sheets

(56) References Cited

U.S. PATENT DOCUMENTS

| | | | |
|---|---|---|---|
| 6,565,265 B2 | 5/2003 | Ohtsuka | |
| 7,194,179 B1 | 3/2007 | Bryant | |
| 7,280,733 B2 | 10/2007 | Larson | |
| 7,369,738 B2 | 5/2008 | Larson | |
| 7,775,726 B2 | 8/2010 | Pepin | |
| 7,934,874 B2 | 5/2011 | Honma et al. | |
| 8,070,367 B2 | 12/2011 | Winberg et al. | |
| 8,118,494 B2 | 2/2012 | Larson | |
| 8,317,406 B2 | 11/2012 | Tamekuni | |
| 8,442,375 B2 | 5/2013 | Bylander | |
| 8,801,300 B2 | 8/2014 | Arao et al. | |
| 8,851,765 B2 | 10/2014 | Larson et al. | |
| 2007/0104425 A1* | 5/2007 | Larson | G02B 6/3801 385/86 |
| 2009/0238523 A1 | 9/2009 | Honma | |
| 2010/0054688 A1* | 3/2010 | Mullaney | G02B 6/4477 385/135 |
| 2010/0316344 A1 | 12/2010 | Bylander | |
| 2011/0002586 A1 | 1/2011 | Nhep | |
| 2011/0044588 A1 | 2/2011 | Larson | |
| 2011/0311185 A1 | 12/2011 | Kachmar | |
| 2013/0094814 A1* | 4/2013 | Ishida | G02B 6/3887 385/77 |
| 2014/0037250 A1 | 2/2014 | Treadwell | |

FOREIGN PATENT DOCUMENTS

| | | |
|---|---|---|
| WO | WO 2006/019516 | 2/2006 |
| WO | WO 2009/148797 | 12/2009 |
| WO | WO 2012/094113 | 7/2012 |
| WO | WO 2013/003295 | 1/2013 |

OTHER PUBLICATIONS

Search Report for CN Appl. No. 201480016552.X, dated Apr. 25, 2016, 2 pp.

* cited by examiner

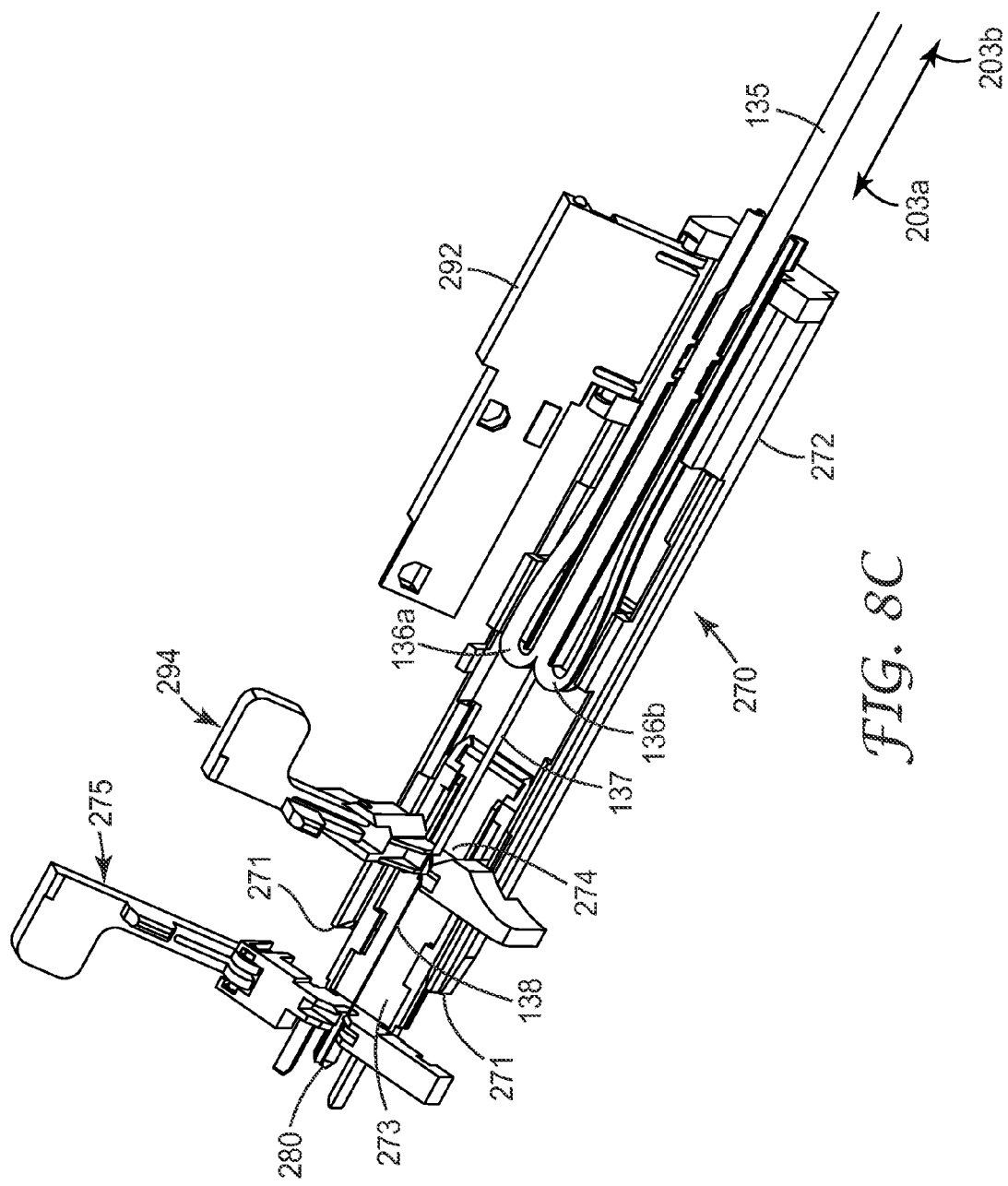

OPTICAL CONNECTOR FOR JACKETED CABLES

BACKGROUND OF THE INVENTION

1. Field of the Invention

The present invention is directed to an optical connector.

2. Related Art

Mechanical optical fiber connectors for the telecommunications industry are known. For example, LC, ST, FC, and SC optical connectors are widely used.

However, commercially available optical connectors are not well suited for field installations. Typically, an adhesive is required to mount these types of connectors on to an optical fiber. This process can be awkward and time consuming to perform in the field. Also post-assembly polishing requires that the craftsman have a higher degree skill.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

Recently, field installable optical fiber connectors have been described. See e.g., U.S. Pat. No. 7,369,738, U.S. Pat. No. 7,775,726, U.S. Pat. No. 8,118,494, and WO 2009/148797 A1.

SUMMARY OF THE INVENTION

According to a first aspect of the present invention, an optical connector for terminating a jacketed optical fiber cable comprises a housing configured to mate with a receptacle. The connector also includes a collar body disposed in the housing, the collar body securing, at a first end, a ferrule, wherein the collar body includes a gripping mechanism disposed in a second portion of the collar body, and wherein the collar body further includes a buffer clamp configured within a third portion of the collar body, the buffer clamp configured to clamp at least a portion of a buffer cladding of the optical fiber upon actuation. The optical connector also includes a backbone to retain the collar body within the housing, the backbone including a mounting structure surrounding a central bore at one end of the backbone, the mounting structure having at least one pocket region configured to receive a slit portion of the cable jacket.

In another aspect, the optical connector also includes a fiber boot configured to engage with the mounting structure and to secure the slit portion of the cable jacket to the mounting structure of the backbone. In one aspect, the boot includes a nut portion having a threaded portion configured to engage outer threads formed on the mounting structure. In addition, the fiber boot further comprises a tail section to restrict a lateral motion of the fiber cable. In one aspect, the nut portion and tail section are separate elements.

In one aspect, the mounting structure includes two pocket regions to receive slit jacket portions, each pocket region including one or more raised surfaces to further secure the slit jacket portions within the mounting structure when the boot is threaded onto the mounting structure. In addition, the mounting structure includes a flattened shelf configured to receive strength members of the optical fiber cable and prevent the strength members from twisting when the boot is mounted onto the mounting section.

In one aspect, the fiber boot and mounting structure can secure jacket portions from optical fiber cable jackets ranging from 1.5 mm to 3 mm in outer diameter.

In another aspect, the secured strength members are held strongly enough within the connector to withstand an axial pull force of at least 10 pounds-force.

In another aspect, an assembly tool for repeatable, accurate fiber insertion into the optical fiber connector is provided. The assembly tool allows the setting of a precise protrusion length of fiber from the end face of the ferrule to simplify the installation process. The fiber connector termination assembly tool includes a base having a connector mount to receive the optical connector and a protrusion setting station having a protrusion setting jig, wherein the base further includes a pivotably attached actuation lever configured to provide for the sequential setting of a protrusion length of the optical fiber from an end of ferrule disposed in the optical connector and to actuate a fiber gripping mechanism disposed in the optical connector. The assembly tool also includes a fiber holder assembly configured to be slidably received in a guide channel of the base, the fiber holder assembly including a fiber clamp to secure the jacketed fiber cable in the fiber holder assembly and first and second pivotably attached lids, the first lid mounted on a first shuttle plate and the second lid mounted on a second shuttle plate configured to independently slide in an axial direction, the first and second lids preventing the optical fiber from curling during the termination process.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 8A and 8B are isometric views of field termination platform and FIG. 8C is an isometric view of a fiber holder assembly according to alternative aspects of the present invention.

Figure 1:
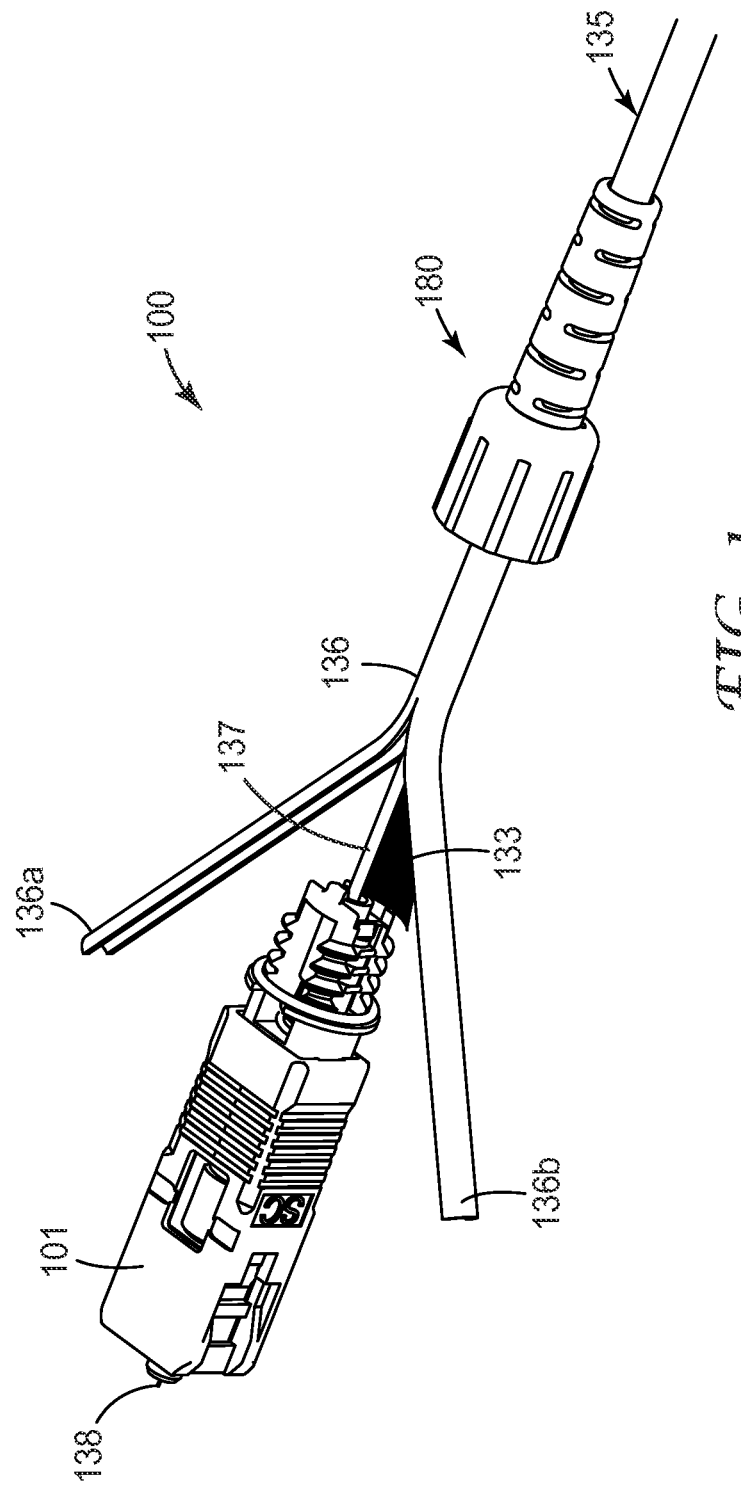
FIG. 1 is an isometric view of an optical connector according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The present invention is directed to an optical connector. In particular, the optical connector of the exemplary embodiments is of compact length and is capable of straightforward field termination of jacketed optical fiber cables having cable diameters of between about 1.5 mm to about 3 mm. The structure of the optical connector provides for retention of cable strength members and the cable jacket in a straightforward manner suitable for field termination. Further, with the straightforward connector termination platform and procedure described herein, reduced assembly times in field termination applications can be accomplished. The exemplary connector(s) described herein can be readily installed and utilized for fiber network installations, as well as in other applications requiring field mounted connectors.

Figure 2:
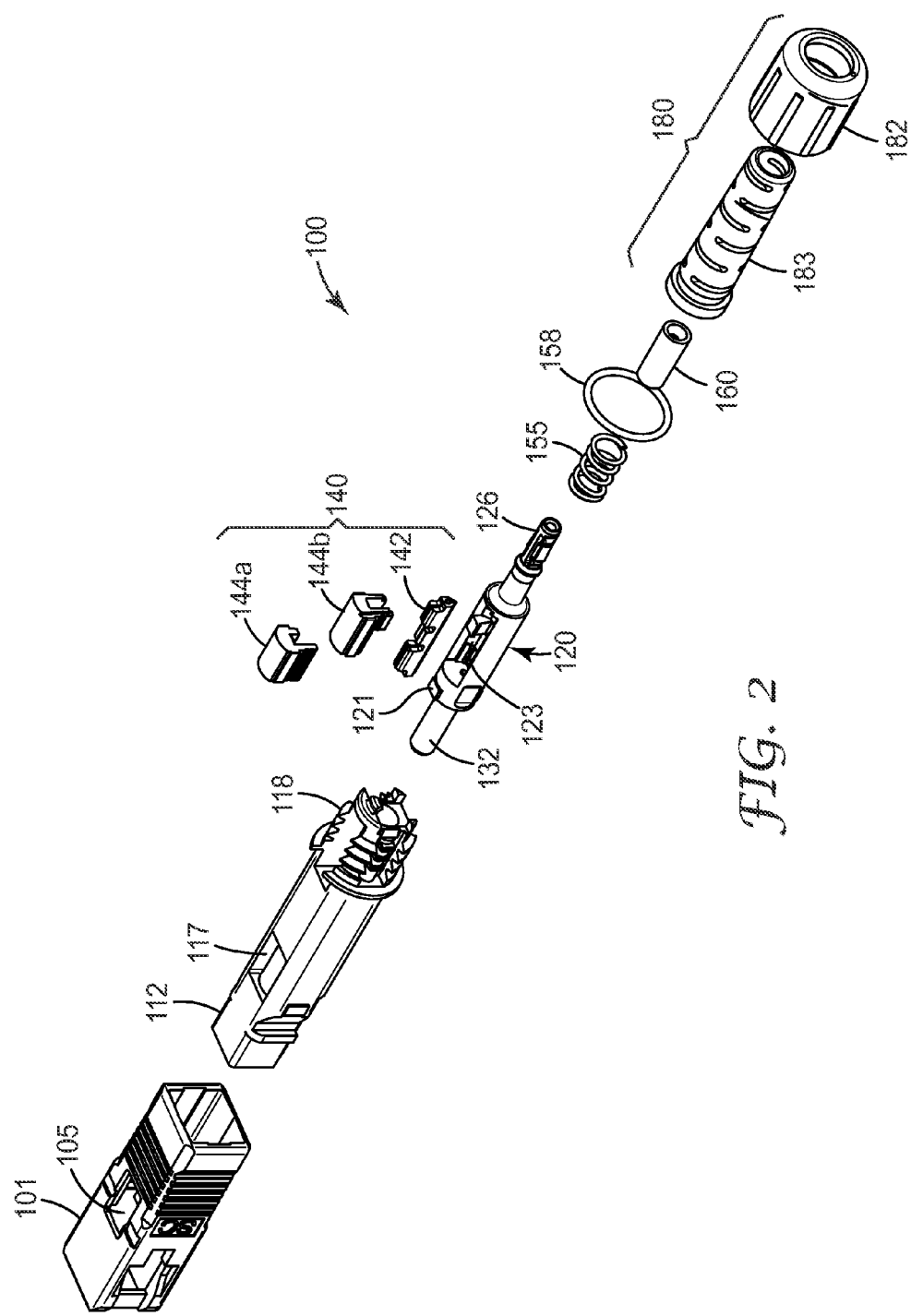
FIG. 2 is an exploded view of an optical connector according to an embodiment of the present invention.
Figure 3:
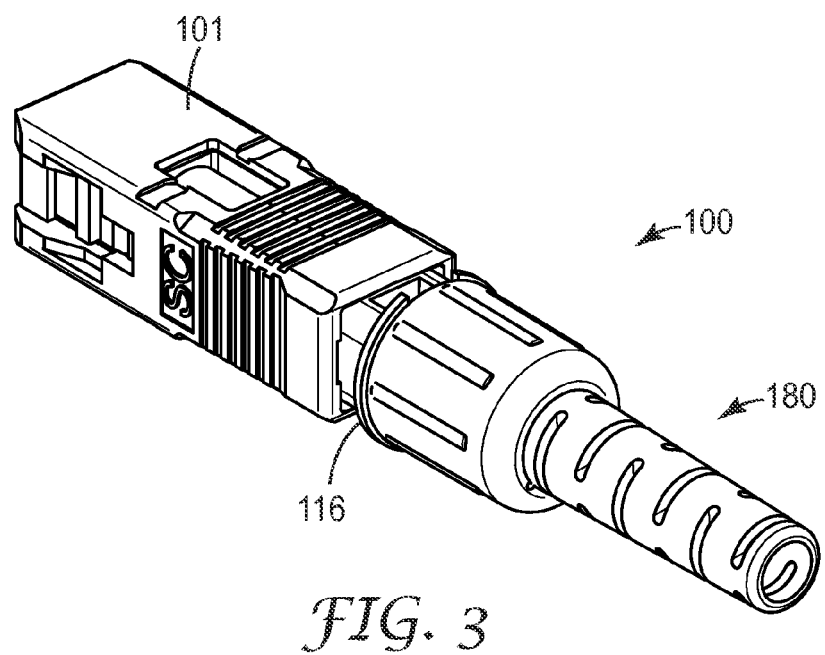
FIG. 3 is an isometric view of an optical connector according to an embodiment of the present invention.

According to an exemplary embodiment of the present invention, an optical fiber connector 100 is shown in isometric view (in a pre-finished state) in FIG. 1, in exploded view in FIG. 2, and in isometric view in FIG. 3. Optical connector 100 is configured to mate with a receptacle. For example, as shown in FIG. 1, exemplary optical connector 100 is configured as having an SC format. However, as would be apparent to one of ordinary skill in the art given the present description, optical connectors having other standard formats, such as ST, FC, and LC connector formats can also be provided.

SC-type optical fiber connector 100 can include a connector housing 101 and a fiber boot 180 to terminate an optical fiber from fiber cable 135. In this exemplary embodiment, housing 101 includes an outer shell configured to be received in an SC receptacle (e.g., an SC coupling, an SC adapter, or an SC socket). A backbone 112 is housed inside the housing 101 and provides structural support for the connector 100. In addition, the backbone 112 further includes at least one access opening 117, which can provide access to actuate a fiber gripping mechanism or mechanical splice disposed within the connector, depending on the connector type. The housing 101 can include at least one access opening 105 (see e.g., FIG. 6) to also provide access to fiber gripping mechanism or mechanical splice. A protective cap 190 (see FIG. 6) can also be provided to protect the ferrule end and/or fiber tip.

In one aspect of the invention, the optical connector can be a remote grip connector where the terminated fiber is not adhesively secured in a ferrule. In an alternative aspect of the invention, the optical connector can be a splice type connector having a mechanical splice to splice a field terminated fiber to a fiber stub pre-mounted and secured within a fiber ferrule. Even though the illustrated embodiments of the invention show a remote grip connector, one of ordinary skill in the art given the present description would understand that in an alternative aspect an optical connector can include a mechanical splice device to splice the field fiber to a fiber stub housed in the connector ferrule.

Figure 4A:
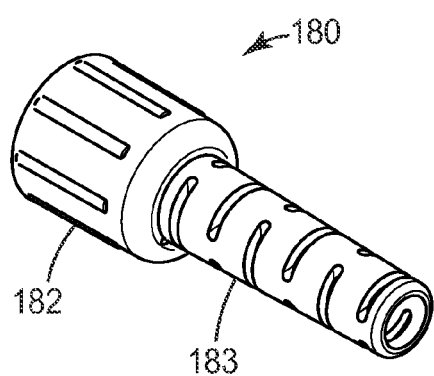
FIGS. 4A and 4B are isometric views of the fiber boot of the optical connector according to an aspect of the present invention.
Figure 4B:
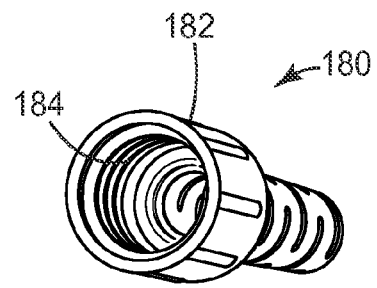
Figure 5A:
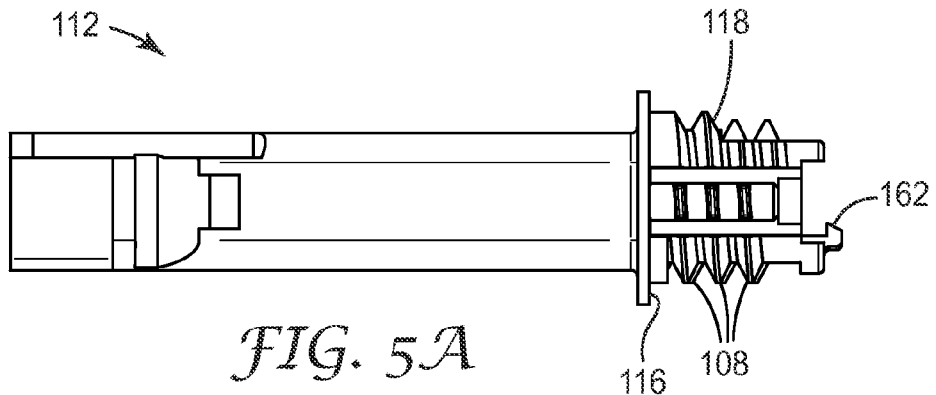
FIGS. 5A-5C are different views of the backbone element of the optical connector according to an aspect of the present invention.
Figure 5B:
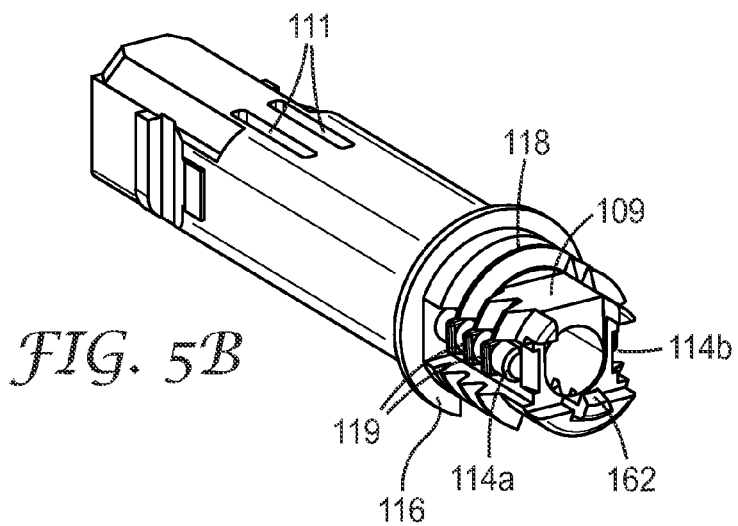
Figure 5C:
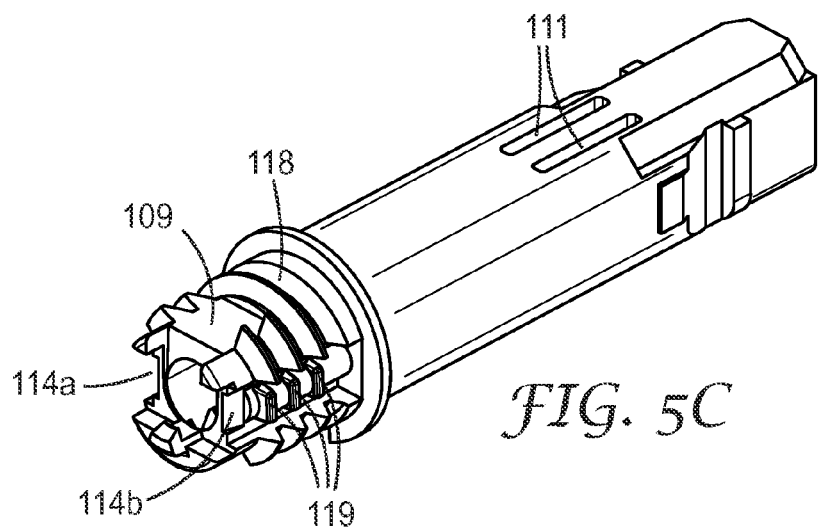

Backbone 112 can further include a mounting section or structure 118 that provides for coupling to the fiber boot 180. FIGS. 4A and 4b show more detailed views of boot 180. FIGS. 5A-5C, described in more detail below, provide further views of mounting structure 118.

Figure 6:
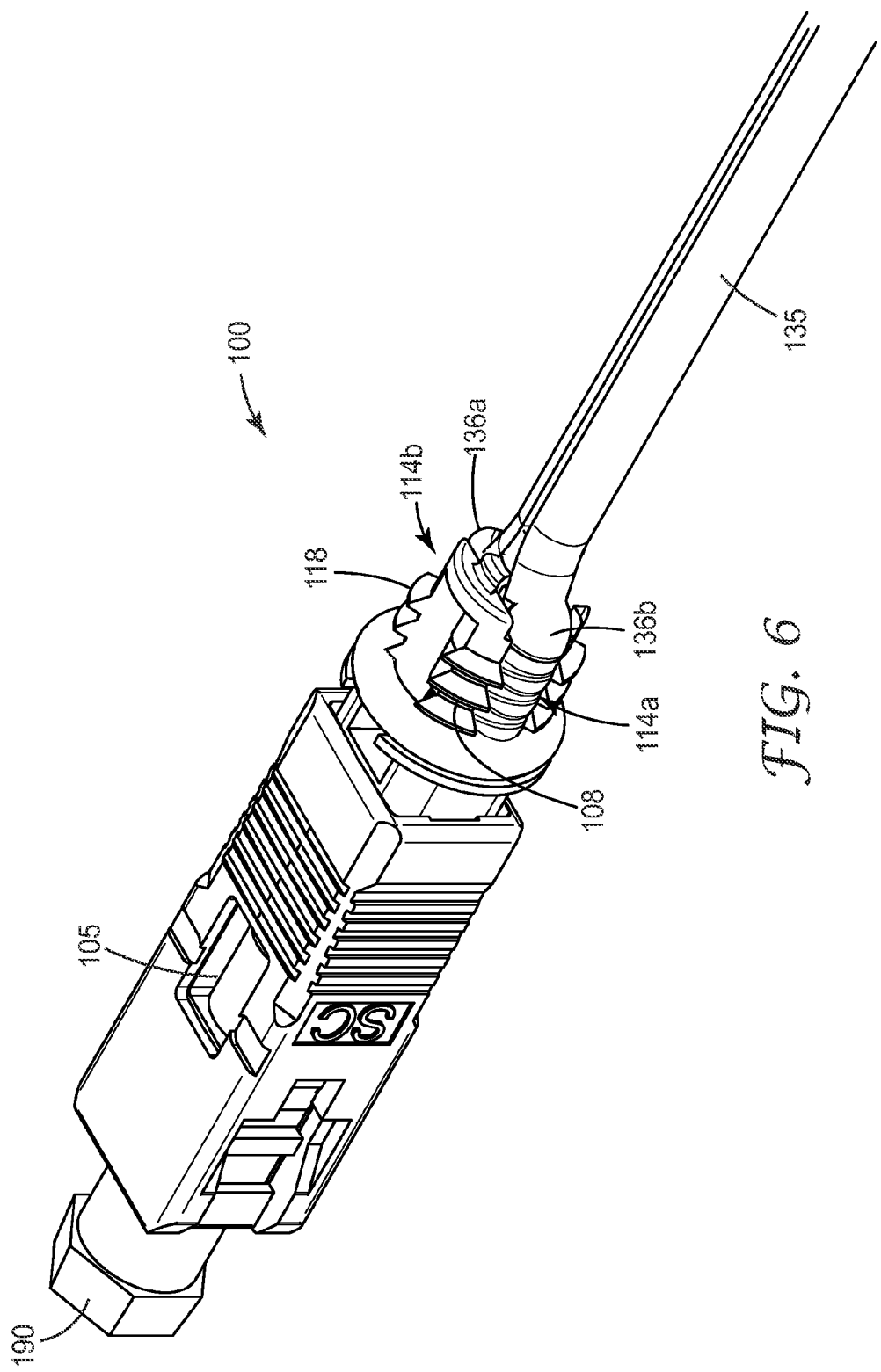
FIG. 6 is an isometric view of the optical connector without the fiber boot attached according to an aspect of the invention.
Figure 7A:
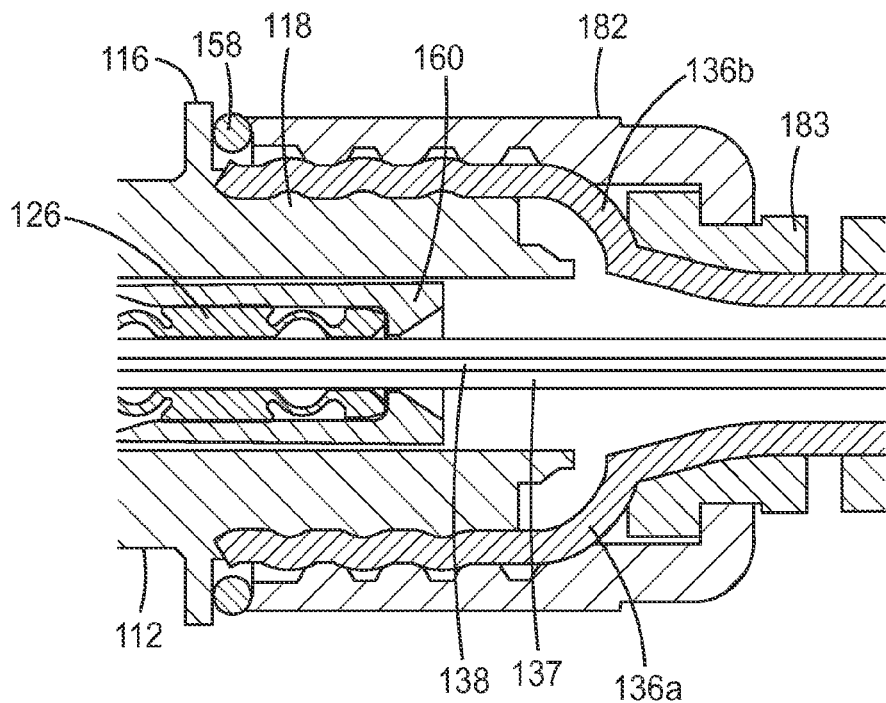
FIGS. 7A and 7B are cross section views of a mounting section of the backbone element of the connector securing fiber cables having different cable jacket outer diameters and FIG. 7C is a cross section view of a mounting section securing strength members of a fiber cable according to different aspects of the present invention.
Figure 7B:
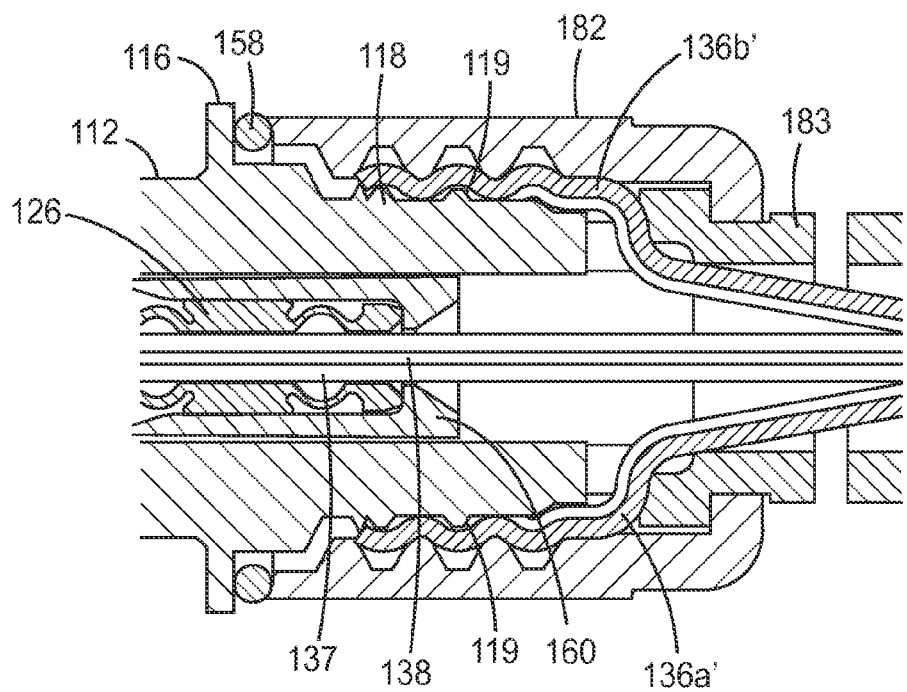
Figure 8A:
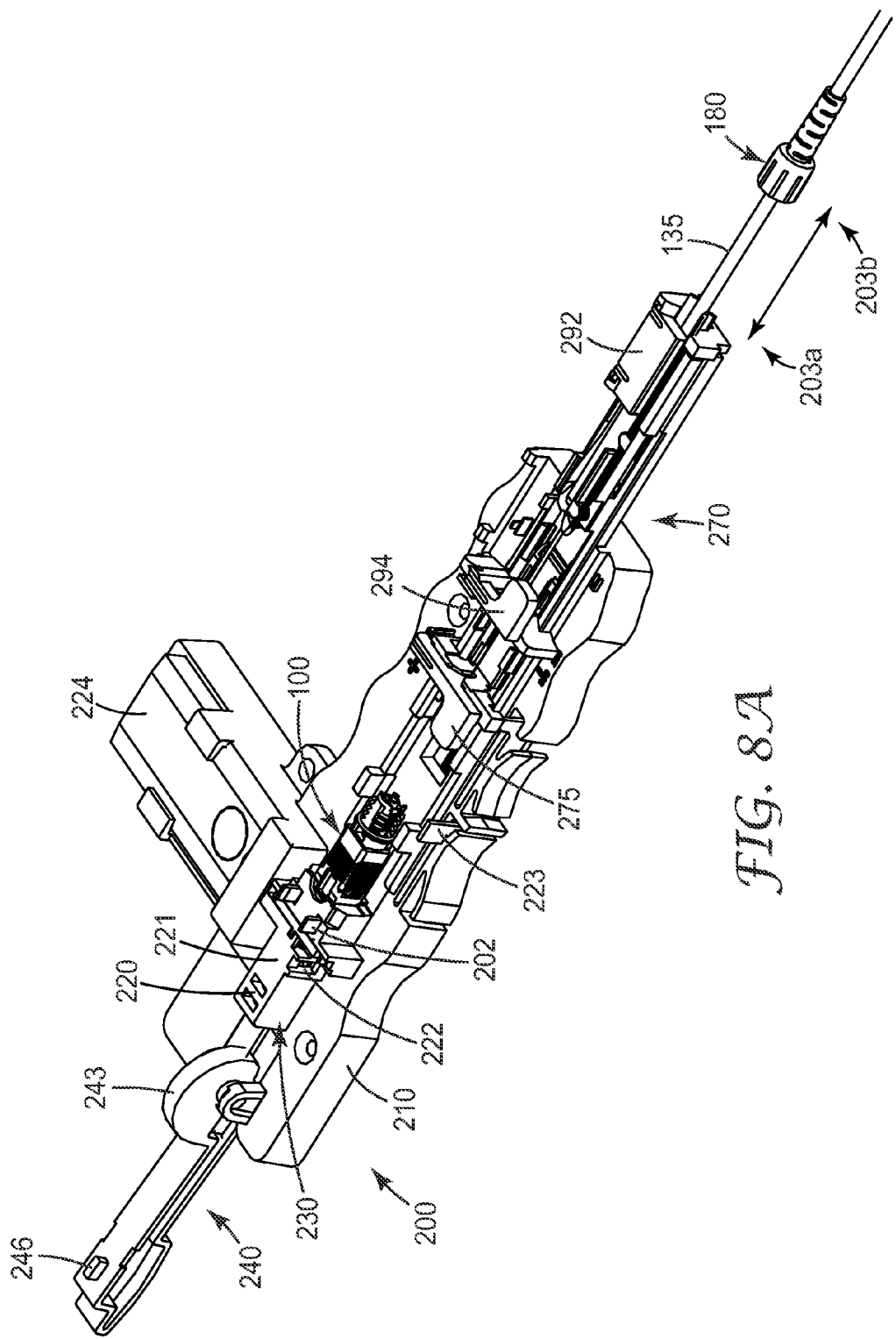

In this exemplary embodiment, connector 100 can be utilized to terminate a field optical fiber cable 135 (see e.g., FIGS. 1, 6, 7A, 7B, and 8A-8C). In one aspect, optical fiber cable 135 is a jacketed optical fiber cable that includes a cable jacket 136, a coated portion 137 (e.g., with a buffer coating or the like), a fiber portion 138 (e.g., the bare clad/core), and strength members 133. In FIG. 1, the buffer and fiber portions are together denoted as fiber portion 138. In FIG. 8C, the fiber portion 138 is stripped of its buffer portion 137.

In one aspect, the strength members 133 comprise aramid, Kevlar™, or polyester yarn or strands disposed between an inner surface of the cable jacket 136 and an outer surface of coated (buffered) portion 137. Optical fiber cable 135 can be a standard cylindrically shaped cable structure or it can be an alternatively shaped structure, such as a rectangular-shaped cable, an oval-shaped cable, or an elliptical-shaped cable. In an exemplary aspect, the optical fiber cable 135 is a standard optical fiber cable having a 900 μm outer diameter coated portion and a cable jacket 136 having an outer diameter of from about 1.5 mm to about 3 mm. Of course, in alternative aspects, the connector can be adapted to accommodate fiber cables of different dimensions, as would be apparent to one of skill in the art given the present description.

Connector 100 further includes a collar body 120 that is disposed within the connector housing and retained therein. The collar body is configured to have some limited axial movement within backbone 112. For example, the collar body 120 can include a shoulder that can be used as a flange to provide resistance against a spring 155, interposed between the collar body and the backbone, when the ferrule 132 is inserted in, e.g., a receptacle.

The collar body 120 can house a ferrule 132 in a first portion, a gripping device 140 in a second portion, and a fiber buffer clamping portion 126 in a third portion thereof. The griping device 140 includes a gripping element 142, an actuating cap 144a, and a retention clip 144b. The gripping element 142 can be seated within nest 123 of collar body 120. The actuating cap can be a multiple piece construction or it can be a single piece construction.

In one aspect, optical connector 100 includes a collar body 120 and an actuation cap 144a made from the same material, but each having a different CTE in the direction of the fiber axis. In particular, the actuation cap has a CTE in the direction of the fiber axis that is substantially different from the CTE of the collar body in this same direction. This factor, along with others, allows the optical fiber connector to be thermally balanced over a substantial (i.e., greater than 100° C.) temperature range (e.g., from −40° C. to 80° C.).

Structurally, collar body 120 includes a first end portion 121 having an opening to receive and house ferrule 132. Ferrule 132 protects the terminal end of the inserted optical fiber (for a remote grip type connector) or ferrule 132 can house an adhesively secured fiber stub (for a splice-type connector). The terminated fiber can comprise a standard single mode or multimode optical fiber, such as SMF 28 (available from Corning Inc.).

Ferrule 132 can be formed from a ceramic, glass, plastic, or metal material to support the optical fiber being inserted and terminated. In a first exemplary aspect, ferrule 132 is a ceramic ferrule. In another exemplary aspect, ferrule 132 is a glass ferrule. The fiber being terminated in the connector can comprise a standard single mode or multimode optical fiber. Ferrule 132 is preferably secured within the collar body portion via an epoxy or other suitable adhesive, or, alternatively, ferrule 132 may be friction fit in the first end portion 121 of the collar body 120. In this exemplary aspect, collar body 120 can be formed or molded from a polymer material, in particular, a polymer material having an anisotropic CTE.

In this exemplary aspect, the gripping device 140 includes an element 142, an actuating cap 144a, and retention clip 144b. Gripping element 142 is mountable in the housing portion of collar body 120 within an element cradle or nest 123. In one aspect, the gripping element 142 comprises a sheet of ductile material having a focus hinge that couples two legs, where each of the legs includes a fiber gripping channel to optimize clamping forces for a conventional glass optical fiber received therein. The ductile material, for example, can be aluminum or anodized aluminum.

In this aspect, element 142 includes separate first and second clamping zones, respectively, to engage with caps 144a, 144b. In addition, a recess can be formed between the clamping zones. With this structure, the collar body 120 can further include a tab or similar structure that extends over the element recess to keep the element 142 in place when the cap is in a non-actuated position or when the cap is being moved from an actuated position to a non-actuated position. In an alternative aspect, the gripping element can have a different shape and construction to grip the optical fiber held therein when actuated.

Cap 144a is preferably configured to engage the gripping element 142 such that the element 142 securely grips a fiber inserted therein. In one aspect, the cap walls snugly fit around the element 142. In operation, as the cap 144a is moved from an open position to a closed position, one or more cam bars located on an interior portion of the cap 144a can slide over the element legs in one or more clamping zones, urging them toward one another. In one aspect, the gripping force applied to one clamping zone is greater that the clamping force applied to the other clamping zone.

The glass portion of a fiber is placed in the groove of the element 142 and is gripped as the element legs are moved toward one another by the cap 144a. In a preferred aspect, the fiber will protrude from the front face of the ferrule a distance of from about 5 µm to about 25 µm for UPC and APC after polishing.

In this aspect, the gripping device 140, particularly by retention clip 144b, is secured to a portion of the collar body 120 and thus has controlled axial starting position and controlled movement with respect to collar body 120.

Removal of the cap 144a can be accomplished through the use of a simple insertion tool that is inserted through slots 111 (see FIGS. 5A and 5B) that pushes the cap arms upwards, permitting the legs of element 142 to be separated, thus permitting removal of the fiber.

According to an aspect of this embodiment, the collar body and cap structure can be formed or molded from the same polymer material. For example, the cap 144a, 144b and collar body 120 can both be formed from a liquid crystal polymer (LCP). A LCP such as VECTRA LCP A130, available from the Ticona Company, can be utilized. However, in this exemplary aspect, the cap 144a, 144b has a CTE, in the direction of the fiber axis, which is substantially different from the CTE of the collar body 120 in this same direction. As such, and in part due to the ductile material used to form element 142, the distance between the element 142 and the ferrule 132 decreases in a controlled fashion with increasing temperature. With this structure, the movement of element 142 is constrained along the fiber axis within the collar body by the retention clip 144b, and is enabled to expand and contract with changes in ambient temperature.

The LCP material exhibits a first CTE in the direction of flow during the molding process and a second CTE (different from the first CTE) in an orthogonal direction to the flow direction. In this exemplary aspect, the first CTE is less than the second CTE. Accordingly, the cap and collar body can be manufactured such that the cap is formed by injection molding the LCP material in a first direction, while the collar body 120 is formed by injection molding the LCP material in a second direction that is orthogonal to the first direction. In this manner, the cap 144a, 144b can have a CTE in the axial direction similar to the CTE of a metal element 142.

In this exemplary aspect, the CTE of the cap and element, along their major axis, is selected to be greater than that of the collar body. As such the front end of the element (closest to the ferrule) can move closer to the back end of the ferrule with increasing temperature.

Further aspects of connector 100 include a buffer clamping portion 126 of the collar body that can be configured to clamp the buffer portion of the optical fiber cable. In an exemplary aspect, the buffer clamping portion 126 is disposed within the interior of the backbone 112 in the fully assembled connector.

Buffer clamping portion 126 can be configured to include a buffer clamp as an integral part of its structure. In one aspect, the buffer clamping portion 126 can be configured to include at least one slot or opening to receive a buffer clamping mechanism, such as a buffer clamp element. In another aspect, buffer clamping portion 126 can include a tapered or ridged outer surface. In a further alternative, buffer clamping portion 126 can include one or more longitudinally formed slots, resulting in a collet-like shape. In a further alternative embodiment, as shown in FIG. 2, the buffer clamping portion 126 can be configured to include a dual tab structure that can be compressed (either elastically or in-elastically) onto the buffer cladding of the optical fiber upon actuation, such as by sleeve 160 described below. The dual tabs can be integrally formed (e.g., by molding) with the buffer clamping portion 126, can be raised with respect to the outer surface of the buffer clamping portion 126, and can be attached at one or both ends through reduced cross-section regions. In addition, the inner surface of the buffer clamping portion can be formed to include ridges or shaped-barbs (not shown) as a one-way catch to allow fiber insertion and resist fiber removal.

According to an exemplary aspect, buffer clamping portion 126 is configured to clamp a standard optical fiber buffer cladding, such as a 900 µm outer diameter buffer coating or a fiber buffer coating having an outer diameter being larger or smaller. To actuate the buffer clamping portion 126, connector 100 further includes an actuation sleeve 160 having an opening extending therethrough that is axially slidably received by the outer surface of buffer clamping portion 126. Sleeve 160 can be formed from a polymer or metal material. Preferably, the hardness of the sleeve 160 is greater than the hardness of the material forming the buffer clamping portion 126. When sleeve 160 is axially moved towards the front (ferrule) end of connector 100, the inner surface of sleeve 160 further forces the surface features of buffer clamping portion 126 inward, thereby clamping the buffer coating of fiber 135.

Backbone 112 can further include a mounting structure 118 that provides for coupling to the fiber boot 180, which can be utilized to protect the optical fiber from bend related stress losses. In addition, according to an aspect of the invention, the mounting structure 118/fiber boot 180 features of connector 100 can be configured to retain the fiber jacket portion of the optical fiber 135 being terminated.

FIGS. 5A-5C show various views of the mounting structure 118 that surrounds a central bore at one end of the backbone 112. The mounting structure 118 comprises a plurality of outer threads 108 disposed on an outer surface thereof to be received within corresponding inner threads 184 of boot 180 (see FIG. 4B). In addition, as explained in further detail below, in one aspect of the present invention, the jacket of the optical fiber cable 135 can be captured and secured between the mounting structure 118 and the boot 180 of the connector. In that respect, mounting structure 118 further includes at least one pocket, in this aspect, pocket regions 114a and 114b, to receive split jacket portions. As shown in FIG. 6, a view of optical connector 100 without the boot 180, pocket regions 114a and 114b can receive slit jacket portions 136a and 136b, while outer threads 108 of the mounting region are open to engage the inner threads of the boot. Referring back to FIGS. 5A-5C, pocket regions 114a, 114b can each include one or more raised surfaces or teeth 119 that help further secure the split jacket portions of the optical fiber cable within the mounting section 118 when the boot 180 is threaded onto the mounting section 118.

In addition, mounting structure 118 can further include a flat area or shelf 109. During the termination process, as strength members 133 (see FIG. 1) are separated from the jacket 136 and optical fiber portion 138, the strength members 133 can be grouped and placed on shelf 109, which can help prevent the strength members from twisting when the boot 180 is mounted onto the mounting section 118.

Further, mounting structure 118 can include a stop member or tab 162 disposed near the central bore. The tab 162 can be bendable to permit insertion of the actuation sleeve 160 into the backbone 112 and can also have a catch portion to prevent the actuation sleeve 160 from sliding out of the backbone 112 during assembly. The mounting structure can further include a shoulder portion 116. When fully assembled, an O-ring 158 can be placed at shelf 116 (see FIGS. 7A and 7B). The O-ring 158 can be utilized as a stop for boot 180 and to better grip strength members that are clamped within the mounting section 118.

According to one aspect of the present invention, housing 101 and backbone 112 can be formed or molded from a polymer material, although metal and other suitably rigid materials can also be utilized. Housing 101 is preferably secured to an outer surface of backbone 112 via snap fit.

To prevent sharp fiber bends at the connector/fiber interface, a boot 180 can be utilized. As shown in FIGS. 4A and 4B, boot 180 includes a rotatable nut portion 182 and a tail section 183. In one aspect, the nut portion 182 and tail section 183 are provided as separate elements (see e.g., FIG. 2), where the tail section 183 is simply inserted through the back end of the nut 182. The tail section 183 has an internal bore configured to accommodate the outer diameter of a standard fiber cable. The tail section 183 can also have a slightly tapered outer diameter. In another aspect, the nut portion 182 and tail section 183 are provided as a single integrated element. The nut section 182 has a threaded interior surface 184 configured to engage with corresponding outer threads 108 from mounting section 118. The tail section 183 has some flexibility sufficient to provide the fiber minimum bend radius to prevent possible signal losses when the fiber is side-loaded. Nut 182 and tail 183 can be formed from different materials or, alternatively, these elements can be formed of the same material. For example, the tail section 183 can be formed from a material that is more flexible than the material forming the nut portion 182. If a two part design is utilized, the tail section 183 can be snap fit into back end of the nut portion 182 in the factory or in the field.

In one aspect of the invention, connector 100 is designed to accommodate fiber cables of differing jacket diameters. As shown in FIGS. 7A and 7B, connector 100 can grip an optical fiber cable having a relatively thick fiber jacket (see FIG. 7A) and an optical fiber cable having a much thinner fiber jacket (see FIG. 7B). In FIG. 7A, an optical fiber cable having a split jacket 136a and 136b is clamped between the nut portion 182 of the fiber boot and the mounting section 118 of the backbone 112. The split jacket portions can be placed in the pockets 114a, 114b described above, where the teeth 119 and inner threads 184 of the boot help retain the split jacket portions. In this example, the cable jacket has an outer diameter of about 3 mm (in this case, a standard 2.9 mm outer diameter). An example fiber cable having this outer diameter includes AllWave Flex, available from OFS and BendBright Elite available from Prysmian Group. The pocket depth allows for an ergonomically acceptable amount of torque (in this aspect, about 24 to about 48 inch-ounces) to be used to fully turn the nut 182.

In FIG. 7B, an optical fiber cable having a split jacket 136a' and 136b' is clamped between the nut portion 182 of the fiber boot and the mounting section 118 of the backbone 112. The split jacket portions can be placed in the pockets 114a, 114b described above, where the teeth 119 and inner threads 184 of the boot help retain the split jacket portions. In this example, the cable jacket has an outer diameter of about 1.5 mm (in this case, a standard 1.6 mm outer diameter). An example fiber cable having this outer diameter includes SMF 28e available from Corning or BendBright XS available from Prysmian Group.

Figure 7C:
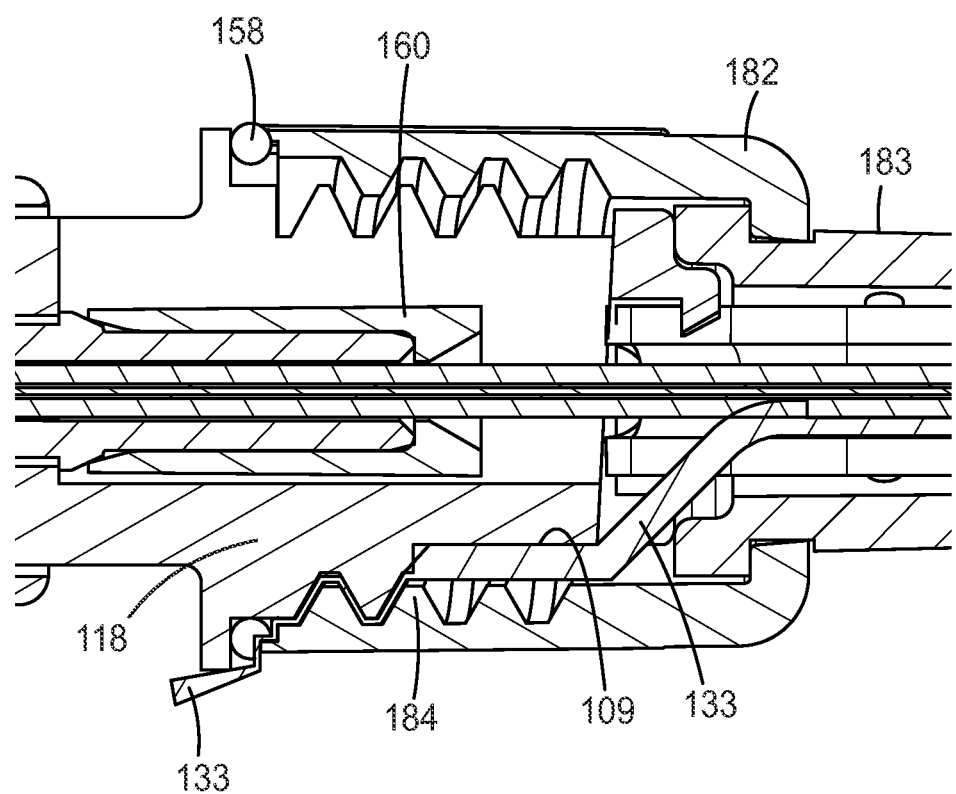

As shown in FIG. 7C, the strength members 133 are secured between the inner threads 184 of the nut 182 and the mounting section 118. The remainder of the strength members can exit the boot nut/mounting section coupling at the O-ring 158 location. As mentioned previously, the strength members 133 can be grouped and disposed on shelf 109 to prevent twisting during the fiber boot mounting process. In general, the strength members can be held strongly enough to withstand a straight pull force of at least 10 pound-force, depending on the concentration of strength members contained in the fiber cable. In addition, in an internal trial, it was determined that an example connector similar to connector 100 withstood a jacket grip pull force of at least 1.8 pound-force.

In another exemplary aspect, a field termination procedure is provided. Please note that while the termination procedure and platform are described herein in the context of a fiber termination in the field, as would be understood by one of ordinary skill in the art, the termination procedure and platform can also be implemented in a factory setting.

Figure 8B:
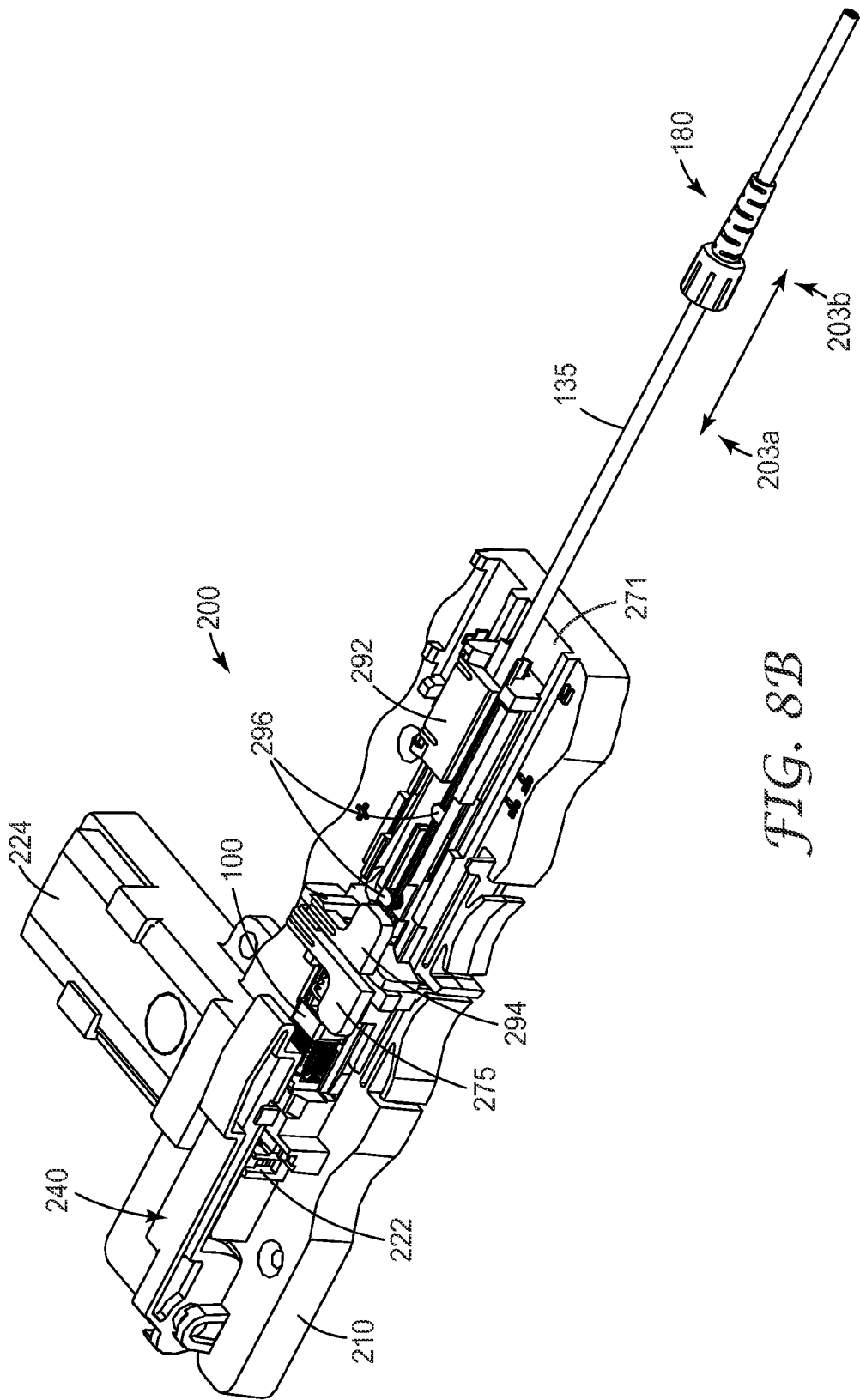

FIGS. 8A-8C show a field termination platform or assembly tool 200 and its fiber cable holder component 270. This assembly tool provides for repeatable, accurate fiber insertion into a remote grip optical fiber connector and allows the setting of a precise protrusion length of fiber from the end face of the ferrule to simplify the installation process and help ensure stable optical performance of the connector. Moreover, the exemplary assembly tool allows the field technician to utilize a fully assembled or nearly fully assembled optical fiber connector during termination to facilitate easier installation of remote grip optical connectors. The assembly tool can be made inexpensively to provide a low cost tool to the customer. In addition, the assembly tool includes a fiber holder that can prevent 250 µm and 900 µm coated optical fiber from buckling while being inserted into the connector. The assembly tool has also been configured so that only a single action is needed to set the protrusion and actuate the cap of the fiber gripping device on the optical connector.

As shown in FIGS. 8A and 8B, assembly tool 200 includes a protrusion setting station 220 disposed on a base 210. Connector mount 202 is disposed adjacent to protrusion setting station 220 such that the end face of the ferrule of an optical fiber connector 100 inserted into the connector mount will be properly positioned within the protrusion setting station to allow viewing of the end of the optical fiber as it is inserted through the optical connector. The connector mount 202 may be attached to the base 210 of the assembly tool 200 by a mechanical fastener, such as screws or snap catches, by an adhesive or other bonding technique, such as welding, or may be integrally formed with the housing 221 of the protrusion setting station 220.

The protrusion setting station 220 enables the craftsman to reliably set a protrusion or protrusion length of the terminal end of the optical fiber that extends from an end face of the connector ferrule, as described previously. The protrusion setting station 220 includes a housing 221, a window 222 within the housing 221 to view the terminal end of the optical fiber, a protrusion setting jig (hidden from view, not shown), an actuation lever 240, and a light source 224 to illuminate the terminal end of the optical fiber. With this structure, the cable and fiber do not buckle (i.e., create a fiber bow).

The actuation lever 240 allows for the sequential setting of the protrusion length of the optical fiber from the end of the optical connector ferrule followed by positioning of the actuating cap of the optical connector 100 which can be used to secure the optical fiber in place within the optical connector 100.

The actuation lever is pivotally attached to the base 210 of assembly tool 200. The actuation lever 240 can include an arc shaped groove 243 to accept a pin on the rear end of the protrusion setting jig and a cap actuator or driver 246 that is configured to contact and press against the actuating cap of the connector, such as actuating cap 144a of the optical fiber connector 100. When the lever 240 is rotated from its position shown in FIG. 8A to its position shown in FIG. 8B, the jig pushes the fiber and cable holder 270 backwards (in the direction of arrow 203b), meeting the resistance of dynamic friction forces and an extension spring force (an extension spring is provided underneath base 210, coupling a latch for holding the cable holder 270 with a member fixed to the bottom of base 210). By incorporating an extension spring, the assembly tool can control the contact force and fiber compression force. For example, a metal extension spring can be used that is less influenced by temperature changes than a fiber bow.

Continuing the movement of the actuation lever brings the driver 246 in contact with the actuating cap and applies a force to push the actuating cap over the gripping element (not shown) within optical connector 100.

The assembly tool 200 includes a fiber holder assembly 270 (see FIG. 8C) having a fiber holder assembly base 272. In one aspect, the fiber holder assembly base 272 is configured to be slidably received in a guide channel 271 of the assembly tool base 210. According to an exemplary aspect of this embodiment, assembly tool base 210, fiber holder assembly 270, and components thereof, can be formed or molded from a polymer material.

Fiber holder assembly 270 includes a fiber clamp 292. Clamp 292 is provided to support and/or temporarily secure an optical fiber cable during the termination process. In this aspect, clamp 292 exerts the holding force that grips the fiber cable 135 and retains it in the fiber holder assembly. Clamp 292 can be latched to provide the desired holding force and can also include a fiber guide or channel to provide more axial support of the fiber along a substantial distance of the assembly tool. In addition, while pivotally attached lids 275 and 294 may be considered as clamps, these elements are not referred to as clamps herein because they do not exert a strong clamping force onto the fiber being terminated. Rather, lids 275 and 294 provide loose fits and prevent the fiber from curling during the termination process.

In this aspect, the lid 275 can be disposed in the front portion of the fiber holder assembly 270, near a buffer clamp actuator 280. Lid 270 is mounted on a first shuttle plate 273, which can axially slide (i.e., in the direction of arrows 203a and 203b) within the fiber holder assembly 270. Lid 294 is disposed between lid 275 and clamp 292 and mounted on a second shuttle plate 274 that is axially movable. In this manner, as shown in FIGS. 8A and 8B, the lids 275 and 294 can be separated or close together during the termination process.

The buffer clamp actuator 280 can include a funnel-shaped fiber guide (or funnel) that can both guide a fiber and actuate a buffer clamp mechanism of connector 100 held in connector mount 202. For example, the clamp actuator 280 can push the sleeve 160 onto the buffer clamping portion 126.

In practice, a fiber termination process can utilize the assembly tool 200 to terminate an optical fiber in the field to an optical connector in a straightforward manner. In addition, the field technician can utilize an optical connector that is fully assembled or nearly fully assembled in the factory, such that additional connector assembly is not necessary in the field.

An installation sequence to mount an optical fiber 135 in an optical connector 100 is now described with respect to the assembly tool 200 shown in FIGS. 8A-8C. For example, to install a remote grip connector onto an optical fiber, the connector 100 can be inserted into connector coupling or connector mount 202, e.g., by a snap fit.

An optical fiber, such as optical fiber cable 135 can be prepared by stripping and cleaving (flat or angled) to expose the terminal end of the optical fiber. The fiber boot 180 can be mounted onto the fiber cable prior to the stripping and cleaving operations. In addition, the outer jacket of the fiber cable can be slit into two jacket portions 136a, 136b using a cable cutting or jacket slitting tool. After slitting the cable jacket 136, the jacket portions and strength members 133 can be pulled back. After stripping a portion of the fiber buffer 137, using a conventional stripping tool, cleaving, using a conventional cleaver can be performed (optionally) with the fiber being held in the fiber holder assembly 270. Cleaving can be either flat or angled, depending on the application. For example, a commercial fiber cleaver such as an Ilsintech MAX CI-08, available from Ilsintech, Korea (not shown) can be utilized to provide an angled cleave.

Referring to FIG. 8C, the optical fiber cable 135 can be positioned in the fiber holder assembly 270, with the lids 275 and 294 open, and the clamp 292 placed in an open position. In addition, lid 275 is placed in a forward position, as shown in FIG. 8C. The fiber cable can be laid in the fiber holder assembly guides that are provided. The slit fiber jacket portions 136a, 136b can be folded back and positioned in the fiber holder assembly 270 as shown in FIG. 8C. Although not shown, the strength members can be bunched into a grouping.

Lids 275 and 294 are then placed in a closed position over the top of the held fiber. The clamp 292 is also placed in a closed position clamping the fiber cable 135 in place in the fiber holder assembly 270. The strength members are also tucked under tabs 296 (see FIG. 8B).

The fiber holder assembly 270 is then loaded into the base 210 as shown in FIG. 8A. The fiber holder assembly is slid towards the connector 100 until the first shuttle plate 273 hits a stop latch 223 formed on the base 210. The fiber holder assembly 270 is further slid forward (in the direction of arrow 203a), even though the first shuttle plate is temporarily stopped, until the front edges 271 of the fiber holder assembly hit stops formed in base 210. During this further movement, lid 294 is slid next to lid 275 (this close positioning is shown in FIG. 8B). At this stage, the exposed fiber tip has been inserted through connector 100. The fiber end as it extends beyond the end of the ferrule may be inspected by activating light source 224 (a simple LED, similar illuminator, or magnifying glass) and viewing through window 222.

As shown in FIG. 8A, lever 240 is in a "loading" position. When the fiber holder assembly 270 is loaded into the base 210, the lever 240 may be brought forward to the position shown in FIG. 8B. This motion triggers a protrusion setting jig which pushes the fiber and fiber holder assembly back (in the direction of arrow 203*b*) about 1 mm. As the lever 240 is fully pressed onto the connector mount 202/connector 100, the driver 246 presses onto the actuating cap of the fiber gripping device to actuate the device and grip the fiber within the connector 100.

The stop latch can then be pressed to allow the buffer clamp actuator 280 to move forward (in the direction of arrow 203*a*) to push the sleeve 160 onto the buffer clamping portion 126 of connector 100. The lids 275, 294 and clamp 292 can be opened and the lever 240 can be moved back into its loading position to allow the field technician to remove the fiber holder and the connector 100 from the connector mount 202. To protect the fiber tip until use, the protective cap 190 (see FIG. 6) can be placed over the ferrule end of the connector 100. The strength members can then be removed from their tucked position and placed over the shelf 109. Excess slit jacket portions can also be removed, leaving an amount suitable to be placed in pockets 114*a*, 114*b*. The nut portion 182 of the boot can be brought towards mounting structure 118 and rotated onto the mounting structure, thus capturing the strength members and jacket portions underneath. Excess strength members can be removed/cut off when the nut portion 182 of the boot 180 is completely mounted onto the mounting section 118.

The protective cap 190 can be removed and the connector can be mounted into a field polisher (not shown) so that the fiber tip can be polished. As mentioned above, the fiber will protrude from the front face of the ferrule a distance of from about 5 µm to about 25 µm for UPC and APC after polishing.

As mentioned previously, the optical connector of the present invention can be a remote grip connector where the terminated fiber is not adhesively secured in a ferrule, or alternatively, the optical connector can be a splice type connector having a mechanical splice to splice a field terminated fiber to a fiber stub pre-mounted and secured within a fiber ferrule. As such, the field termination assembly tool and procedure can be modified to terminate a fiber in a splice type connector, as would be apparent to one of ordinary skill in the art given the present description.

The exemplary connector shown above can provide for straightforward field fiber termination for standard or non-standard jacketed optical fiber cables, without the need for a power source, adhesive, costly installation tools, or field polishing. The exemplary connector can have an overall length of less than two inches.

Various modifications, equivalent processes, as well as numerous structures to which the present invention may be applicable will be readily apparent to those of skill in the art to which the present invention is directed upon review of the present specification.

We claim:

1. An optical connector for terminating a jacketed optical fiber cable containing an optical fiber, the jacketed cable including a jacket, comprising:
    a housing configured to mate with a receptacle;
    a collar body disposed in the housing, the collar body securing, at a first end, a ferrule, wherein the collar body includes a gripping mechanism disposed in a second portion of the collar body, and wherein the collar body further includes a buffer clamp configured within a third portion of the collar body, the buffer clamp configured to clamp at least a portion of a buffer cladding of the optical fiber upon actuation;
    a backbone to retain the collar body within the housing, the backbone including a mounting structure surrounding a central bore at one end of the backbone, the mounting structure having at least one pocket region configured to receive a slit portion of the cable jacket;
    a fiber boot configured to engage with the mounting structure and to secure the slit portion of the cable jacket to the mounting structure of the backbone; and
    wherein the mounting structure includes at least two pocket regions to receive slit jacket portions, each pocket region including one or more raised surfaces to further secure the slit jacket portions within the mounting structure when the boot is threaded onto the mounting structure.

2. The optical connector of claim 1, wherein the boot includes a nut portion having a threaded portion configured to engage outer threads formed on the mounting structure.

3. The optical connector of claim 2, wherein the fiber boot further comprises a tail section to restrict a lateral motion of the fiber cable.

4. The optical connector of claim 1, wherein the mounting structure includes a flattened shelf configured to receive strength members of the optical fiber cable and prevent the strength members from twisting when the boot is mounted onto the mounting section.

5. The optical connector of claim 3, wherein the nut portion and tail section are separate elements.

6. The optical connector of claim 1, further comprising a buffer clamp actuation sleeve configured to be received on an outer surface of the third portion of the collar body and configured to slidably actuate the buffer clamp.

7. The optical connector of claim 1, wherein the optical connector is configured to mate with an SC receptacle.

8. The optical connector of claim 1, wherein the gripping mechanism comprises a gripping element and at least one actuating cap.

9. The optical connector of claim 1, wherein the buffer clamp comprises a dual-tab structure formed within the third portion and having a portion thereof extending outside an outer surface of the third portion that is collapsible upon actuation.

10. The optical connector of claim 1, wherein fiber jacket has an outer diameter of about 3 mm or less.

11. The optical connector of claim 1, wherein fiber jacket has an outer diameter of about 1.6 mm.

12. The optical connector of claim 1, wherein the fiber boot and mounting structure can secure jacket portions from optical fiber cable jackets ranging from 1.5 mm to 3.0 mm in outer diameter.

13. The optical connector of claim 4, wherein the strength members are held strongly within the optical connector enough to withstand an axial pull force of at least 10 pounds-force.

14. The optical connector of claim 13, wherein at least a substantial portion of the strength members are secured between outer threads of the mounting structure and inner threads of a nut portion of the boot.

* * * * *